United States Patent
Liu et al.

(10) Patent No.: US 10,891,101 B2
(45) Date of Patent: Jan. 12, 2021

(54) METHOD AND DEVICE FOR ADJUSTING THE DISPLAYING MANNER OF A SLIDER AND A SLIDE CHANNEL CORRESPONDING TO AUDIO SIGNAL AMPLIFYING VALUE INDICATED BY A POSITION OF THE SLIDER

(71) Applicant: TENCENT TECHNOLOGY (SHENZHEN) COMPANY LIMITED, Guangdong (CN)

(72) Inventors: Dongdong Liu, Shenzhen (CN); Qichao Yang, Shenzhen (CN); Chuntao Xiao, Shenzhen (CN); Yilun Wan, Shenzhen (CN); Siya Liang, Shenzhen (CN); Jinda Yu, Shenzhen (CN); Yongshou Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 68 days.

(21) Appl. No.: 15/995,641

(22) Filed: Jun. 1, 2018

(65) Prior Publication Data

US 2018/0300101 A1 Oct. 18, 2018

Related U.S. Application Data

(63) Continuation of application No. PCT/CN2017/070963, filed on Jan. 12, 2017.

(30) Foreign Application Priority Data

Jan. 15, 2016 (CN) .......................... 2016 1 0027396

(51) Int. Cl.
*G06F 9/48* (2006.01)
*G06F 3/16* (2006.01)
(Continued)

(52) U.S. Cl.
CPC ............ *G06F 3/165* (2013.01); *G06F 3/0488* (2013.01); *G06F 3/04847* (2013.01);
(Continued)

(58) Field of Classification Search
CPC .... G06F 3/165; G06F 3/04847; G06F 3/0488; G06T 11/001; G06T 11/60; G06T 2200/24
See application file for complete search history.

(56) References Cited

U.S. PATENT DOCUMENTS 6,512,530 B1 * 1/2003 Rzepkowski ....... G06F 3/04847 715/764
2003/0063130 A1 4/2003 Barbieri et al.
(Continued)

FOREIGN PATENT DOCUMENTS

CN 1394343 A 1/2003
CN 101110215 A 1/2008
(Continued)

OTHER PUBLICATIONS

International Search Report with Translation for International Application No. PCT/CN2017/070963 dated Apr. 26, 2017.
(Continued)

*Primary Examiner* — Jennifer N To
*Assistant Examiner* — K C Chen
(74) *Attorney, Agent, or Firm* — Anova Law Group, PLLC (57) ABSTRACT

A method and device for displaying a control belongs to the field of audio adjustment. At least one adjustment control is displayed on an equalizer displaying interface, with the adjustment control including a slide channel and a slider, and with the adjustment control being used for adjusting an audio signal amplifying value at a frequency band according to a position of the slider on the slide channel. The position
(Continued)

of the slider on the slide channel is obtained when a sliding signal of the slider is received. A displaying manner of the adjustment control is adjusted according to the position of the slider.

15 Claims, 7 Drawing Sheets

(51) Int. Cl.
    *G06F 3/0488*      (2013.01)
    *G06F 3/0484*      (2013.01)
    *G06T 11/00*      (2006.01)
    *G06T 11/60*      (2006.01)

(52) U.S. Cl.
    CPC ............. *G06T 11/001* (2013.01); *G06T 11/60* (2013.01); *G06T 2200/24* (2013.01)

(56) References Cited

U.S. PATENT DOCUMENTS

| | | | | |
|---|---|---|---|---|
| 2008/0019531 A1* | 1/2008 | Kimijima | ................. | H04S 7/30 |
| | | | | 381/1 |
| 2008/0062443 A1* | 3/2008 | Olson | ................. | H04N 1/6011 |
| | | | | 358/1.9 |
| 2010/0266143 A1* | 10/2010 | Oliver | ................. | H03G 5/005 |
| | | | | 381/103 |
| 2012/0057725 A1 | 3/2012 | Nakamura | | |
| 2015/0180432 A1* | 6/2015 | Gao | ................. | H03G 3/3005 |
| | | | | 381/57 |
| 2015/0193196 A1* | 7/2015 | Lin | ................. | G06F 3/165 |
| | | | | 715/716 |

FOREIGN PATENT DOCUMENTS

| | | |
|---|---|---|
| CN | 102385888 A | 3/2012 |
| CN | 103176700 A | 6/2013 |
| CN | 103268189 A | 8/2013 |
| CN | 104881225 A | 9/2015 |
| CN | 105022562 A | 11/2015 |
| CN | 105204732 A | 12/2015 |
| CN | 105487780 A | 4/2016 |

OTHER PUBLICATIONS

The State Intellectual Property Office of the People's Republic of China (SIPO) Office Action 1 for 201610027396.8 dated Mar. 13, 2020 10 Pages (including translation).

* cited by examiner

210 — when a selection signal of the selection control is received, obtain a selected sound effect mode 211 — Acquire predetermined audio signal amplifying value at each frequency band corresponding to the selected sound effect mode 212 — Adjust the displaying manner of the adjustment control according to the predetermined audio signal amplifying value

METHOD AND DEVICE FOR ADJUSTING THE DISPLAYING MANNER OF A SLIDER AND A SLIDE CHANNEL CORRESPONDING TO AUDIO SIGNAL AMPLIFYING VALUE INDICATED BY A POSITION OF THE SLIDER

CROSS-REFERENCE TO RELATED APPLICATIONS

This application is a continuation of International Application No. PCT/CN2017/070963, filed on Jan. 12, 2017. This application claims the benefit and priority of Chinese Patent Application No. 201610027396.8, filed Jan. 15, 2016. The entire disclosures of each of the above recited applications are hereby incorporated herein by reference in their entireties.

BACKGROUND

Field

The present disclosure relates to the multimedia playing field, in particular to a method and device for displaying a control.

Description of Related Technology

With the continuous development of the multimedia playing technology, more and more media players are equipped with a built-in audio equalizer, which is convenient for users to adjust output of an amplifier at each frequency band of the audio signal according to the style of a played music.

The audio equalizer usually provides a plurality of adjustment controls corresponding to different frequency bands, each adjustment control includes a slide channel and a slider. The user may adjust position of the slider upwards or downwards along the slide channel to adjust the output of the amplifier at the corresponding frequency band of the audio signal.

SUMMARY

Various embodiments of the present disclosure disclose a method for displaying a control. The method displays at least one adjustment control on an equalizer displaying interface. The adjustment control includes a slide channel and a slider. The adjustment control is used for adjusting an audio signal amplifying value at a frequency band according to a position of the slider on the slide channel. The method of the present disclosure obtains position of the slider on the slide channel and adjusts the displaying manner of the adjustment control according to the position of the slider.

Various embodiments of the present disclosure disclose a device for displaying a control, the device includes: one or more memories; one or more processors; wherein the one or more memories store instructions executable by the one or more processors to implement the above method.

Various embodiments of the present disclosure disclose a non-transitory computer readable storage medium, the storage medium comprises: storing computer readable instructions that, when executed by one or more processors, cause the one or more processors to implement the above method.

BRIEF DESCRIPTION OF THE DRAWINGS

Hereinafter, the drawings used in the examples of the present disclosure are briefly described to make the technical solution of the examples of the present disclosure clearer. It should be noted that, the following drawings figures are merely some examples of the present disclosure. Those with ordinary skill in the art may obtain other drawings figures based on the following.

DETAILED DESCRIPTION

In a process of carrying out embodiments of the present disclosure, the inventors have found that current technology faces at least the following challenges.

When a user adjusts outputs of amplifiers at different frequency bands of video signals through adjustment controls, the audio equalizer only displays the change of the amplifying values by numeric values, which is not intuitive, and since users are less sensitive to numbers, it is not convenient for the users to perform the adjustment.

In order to make the technical solution and advantages of the present disclosure clearer, detailed description of the present disclosure is described in detail with reference to accompanying drawings.

Figure 1:
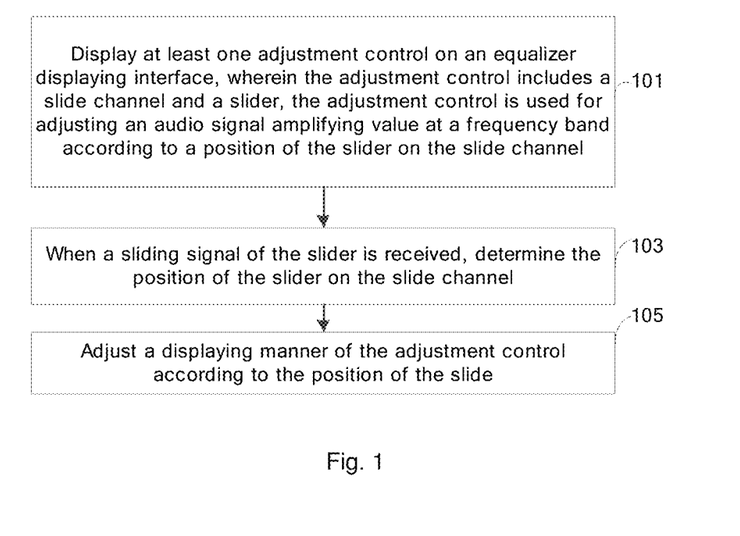
FIG. 1 is a flow chart illustrating a method for displaying a control according to various embodiments of the present disclosure.

A method for displaying a control provided by various embodiments of the present disclosure is applicable for a media player application (hereinafter referred to as a media player), such as QQ music, the media player application can be installed in an electronic device, which may be a smart phone, a tablet computer, an MP3 (Moving Picture Experts Group Audio Layer III) player, an MP4 (Moving Picture Experts Group Audio Layer IV) player, or a laptop portable computer (camera, video camera) and so on. Normally, the media player is equipped with an audio equalizer, and at least one adjustment control is displayed on an audio equalizer displaying interface, the adjustment control is used for adjusting an amplifying value at each frequency band of an audio signal. FIG. 1 is a flow chart of a method for displaying a control provided by various embodiments of the present disclosure. The method includes the following.

At block 101, at least one adjustment control is displayed on an equalizer displaying interface, wherein the adjustment control includes a slide channel and a slider, the adjustment control is used for adjusting an audio signal amplifying value at a frequency band according to a position of the slider sliding on the slide channel.

At block 103, when a sliding signal of the slider is received, the position of the slider on the slide channel is determined.

At block 105, a displaying manner of the adjustment control is adjusted according to the position of the slider.

The displaying manner of the adjustment control may be adjusted according to the following.

1, color of at least one of the slider, a first part and a second part of the slide channel is adjusted according to the position of the slider; wherein the first part is from the slider to bottom of the slide channel, the second part is from the slider to top of the slide channel.

2, brightness of at least one of the slider, the first part and the second part of the slide channel is adjusted according to the position of the slider;

3, a size of the slider and a width of the slide channel are adjusted according to the position of the slider.

In summary, according to the method for displaying a control provided by various embodiments of the present disclosure, when the slider of the adjustment control slides, the position of the slider on the slide channel is obtained, and the displaying manner of the adjustment control is adjusted according to the position of the slider. It solves problems that the audio equalizer only displays the change of the amplifying value by numeric values, when a user adjusts the amplifying value at a frequency band through the adjustment control, the displaying effect is not intuitive, and the user is less sensitive to numeric values, which is not convenient for the user to perform the adjustment. The solution of the present disclosure changes the displaying manner of the adjustment control according to the position of the slider. As such, the user can know the change of the audio signal amplifying value more intuitively, thus adjusting efficiency of the user is improved.

In various embodiments, the media player can change the displaying color of the adjustment control according to the position of the slider on the slide channel, so that the user may feel the change of the audio signal amplifying value during the process of adjustment visually. For convenience of description, shadow lines of different backgrounds of the respective schematic diagram in various embodiments represent different colors.

Figure 2A:
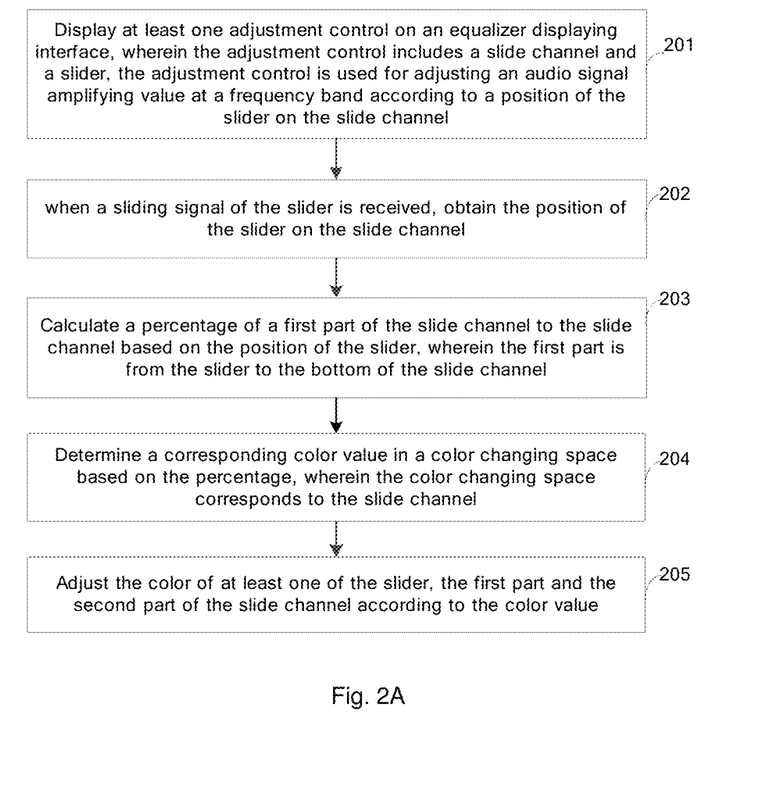
FIG. 2A is a flow chart illustrating another method for displaying a control according to various embodiments of the present disclosure.

FIG. 2A is a flow chart of a method for displaying a control provided by various embodiments of the present disclosure. The method includes the following.

In block 201, at least one adjustment control is displayed on an equalizer displaying interface, wherein the adjustment control includes a slide channel and a slider, the adjustment control is used for adjusting an audio signal amplifying value at a frequency band according to a position of the slider on the slide channel.

When an electronic device such as a smartphone plays multimedia content through a media player, the user may enter an equalizer displaying interface via an entry of an equalizer in a playing page of the media player. The equalizer displaying interface includes at least one adjustment control, and different adjustment controls are used for adjusting outputs of amplifiers at different frequency bands of the audio signal. Each adjustment control includes a slide channel and a slider which may slide upwards and downwards along the slide channel. When the slider is at the top of the slide channel, the output of the amplifier of the signal, e.g., the signal amplifying value, reaches the maximum value, when the slider is at the bottom of the slide channel, the output of the amplifier of the signal reaches the minimum value, e.g., the adjustment control adjusts the output of the amplifier of the signal based on the position of the slider on the slide channel. In various embodiments, the equalizer displaying interface may include three adjustment controls, the three adjustment controls are used for bass control (frequency band from 20 Hz to 200 Hz, affecting brightness and saturation of the sound), alto control (frequency band from 200 Hz to 4 kHz, affecting thickness and loudness of the sound) and treble control (frequency band from 4 kHz to 20 kHz, affecting the penetration of sound) respectively. It should be noted that, in the other embodiments, the equalizer displaying interface may also include five adjustment controls respectively for bass control, alto-bass control, alto control, alto-treble control and treble control of the output of the amplifier of the audio signal. The number of the adjustment controls is not restricted in embodiments of the present disclosure.

In addition, the slide channels in the different adjustment controls have the same length, but audio signal amplifying range indicated by different slide channels may be the same or different, which is not restricted in the embodiments of the present disclosure.

Figure 2B:
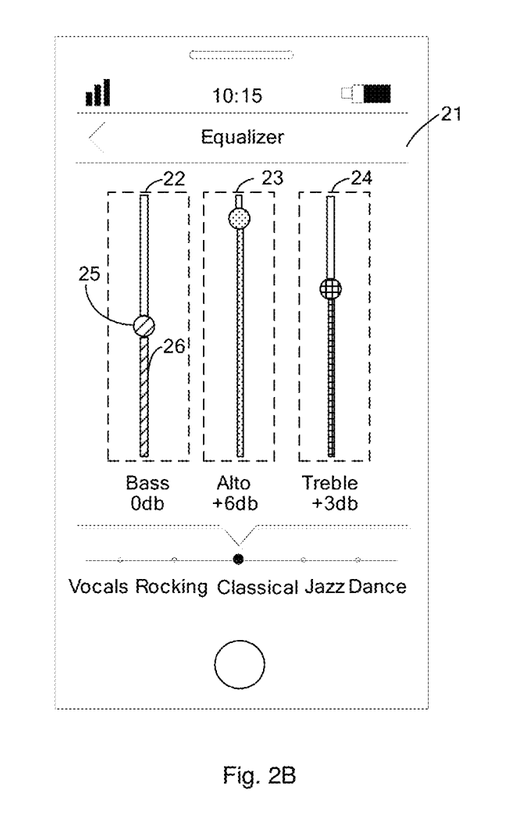
FIG. 2B is a schematic diagram illustrating an interface related to the embodiment shown in FIG. 2A.

As shown in FIG. 2B, the equalizer displaying interface 21 includes a first adjustment control 22, a second adjustment control 23 and a third adjustment control 24, each of which includes a slider 25 and a slide channel 26, and lengths of each slide channel 26 are the same.

In block 202, when a sliding signal of the slider is received, the position of the slider on the slide channel is obtained.

After entering the equalizer displaying interface, the media player monitors whether the slider of the adjustment control slides, and when receiving the sliding signal of the slider, the position of the slider on the slide channel is obtained.

Figure 2C:
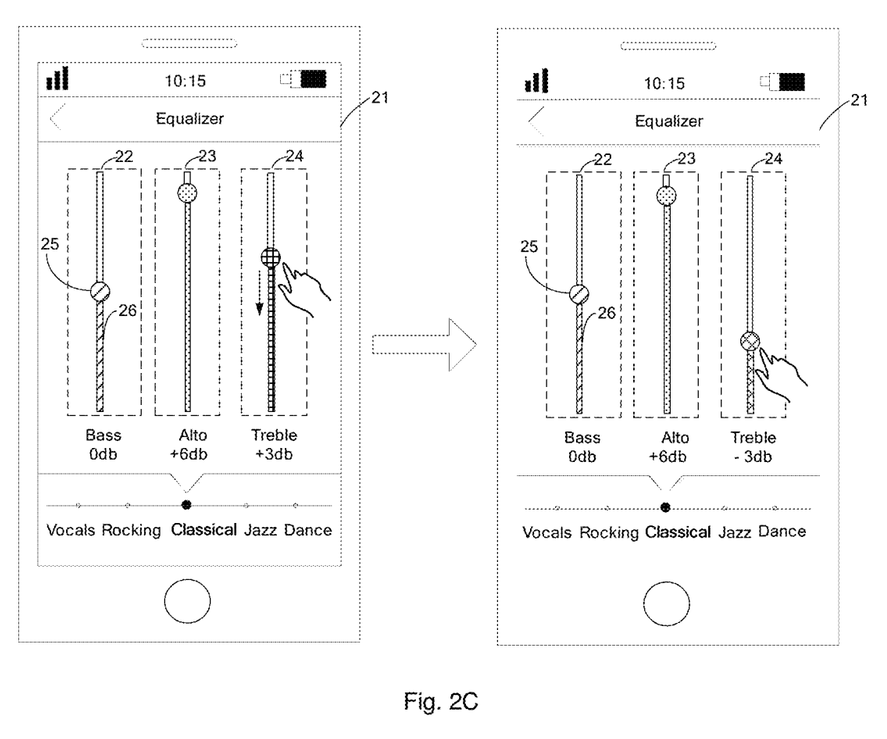
FIG. 2C is an implementation schematic diagram of the embodiment shown in FIG. 2A.

For example, as shown in FIG. 2C, when the slider 25 of the third adjustment control 24 slides downwards along the corresponding slide channel 26, the media player obtains the position where the slider 25 is located on the slide channel 26.

In block 203, a percentage of a first part of the slide channel to the slide channel is calculated based on the position of the slider, wherein the first part is from the slider to bottom of the slide channel.

The slide channel is divided by the slider into a first part and a second part, wherein the first part is from the slider to bottom of the slide channel and the second part is from the slider to top of the slide channel. After the media player obtains the position of the slider, the percentage of the first part to the slide channel is calculated based on the position of the slider.

In various embodiments, the media player may calculate total length of the slide channel (in pixels) based on a vertical coordinate of the top of the slide channel and a vertical coordinate of the bottom of the slide channel, calculate the length of the first part of the slide channel according to a vertical coordinate of a center point of the slider and a vertical coordinate of the bottom of the slide channel, and calculate the percentage of the first part to the slide channel according to a formula: the length of the first part of the slide channel/the total length of the slide channel. For example, the length of the first part of the slide channel is 125 px and the total length of the slide channel is 500 px, the percentage of the first part to the slide channel is 125/500=25%.

In block 204, a corresponding color value in a color changing space is determined based on the percentage, wherein the color changing space corresponds to the slide channel.

The slide channel of the adjustment control corresponds to the color changing space in which the colors change gradually, e.g., when the slider slides on the slide channel, the color of the adjustment control changes gradually. For example, color indexes in the color changing space may be 65536 colors (e.g., 65536 colors are included in the color changing space), and the color values corresponding to the respective colors are continuous.

After the percentage of the first part to the slide channel is calculated, the media player determines the corresponding color value in the color changing space based on the percentage, for example, the corresponding color value in the color changing space is determined as #d58418 (orange) according to the percentage.

It should be noted that, in various embodiments, when the color changing space contains less colors, the media player may also determine the corresponding color value in the color changing space based on a percentage range that the calculated percentage falls in (as the slider slides on the slide channel, color of the adjustment control does not change gradually). The correspondence between the percentage range and the color value in the color changing space may be as shown in Table 1.

TABLE 1

| Percentage Range | 0%-25% | 25%-50% | 50%-75% | 75%-100% |
|---|---|---|---|---|
| Color value | Color value A | Color value B | Color value C | Color value D |

In block 205, color of at least one of the slider, the first part and the second part of the slide channel is adjusted according to the color value.

When adjusting the color of the adjustment control, the media player may change the color of at least one of the slider, the first part of the slide channel and the second part of the slide channel. For example, as shown in FIG. 2C, when the slider 25 of the third adjustment control 24 slides, the media player changes the color of the slider 25 and the first part of the slide channel 26 according to the determined color value, while the color of the second part of the slide channel 26 remains unchanged.

The media player system does not provide an API (Application Programming Interface) to change the color of the adjustment control. Therefore, after determining the color value, the music player needs to generate corresponding image frame data based on the color value, and render the image frame data through the system API, so as to display the adjustment control with the changed color on the equalizer displaying interface. In various embodiments, this block may include the following.

In block 205A, the image frame data corresponding to changed color of the adjustment control is generated based on the color value.

It should to be noted that the image frame data further includes parameters for indicating areas whose colors are changed. For example, when only the color of the slider and the first part of the slide channel are changed, the image frame data further includes parameters indicating the slider and the first part of the slide channel.

In block 205B, the system API is called to render the image frame data to display the adjustment control with the changed color on the equalizer displaying interface.

After generating the corresponding image frame data, the music player calls the API provided by the system (for example, an onDraw interface in the Android system) to render the image frame data, so as to display the adjustment control with the changed color on the equalizer displaying interface. As such, users may know the change of the output of the amplifier of the audio signal more intuitively.

In various embodiments, when the slider slides from the bottom of the slide channel to the top of the slide channel, the adjustment control changes from green to orange and then to red, and the color of the adjustment control changes gradually. When the equalizer displaying interface contains multiple adjustment controls, each adjustment control shows its own color according to the position of the slider, and a color combination is formed (such as orange, green and red). Compared with the boring numeric values, users may remember the corresponding color combination more easily, which greatly improves the adjustment efficiency of the users.

In view of the above, according to the method for displaying a control provided by the present embodiment when the slider of the adjustment control slides, the position of the slider on the slide channel is obtained, and the displaying manner of the adjustment control is adjusted according to the position of the slider. It solves the problem that the audio equalizer only displays the change of the audio signal amplifying value by numeric values, when a user adjusts the audio signal amplifying value at each frequency band through the adjustment controls, the displaying effect is not intuitive, and the user is less sensitive to numbers, which is not efficient for the user to perform the adjustment. Through adjusting the displaying manner of the adjustment control according to the position of the slider, the user can more intuitively know the change of the audio signal amplifying value, thus adjustment efficiency of the user is improved.

In various embodiments, the media player calculates the corresponding color value based on the position of the slider and changes the color of the adjustment control according to the color value. Therefore, the user can sense the change of the signal amplifying value according to change of the color of the adjustment control more intuitively, which is convenient for the user to perform the adjustment.

Based on the embodiment shown in FIG. 2A, in other embodiments, the media player may change the brightness of the adjustment control according to the position of the slider on the slide channel, so that the user may sense the change of the audio signal amplifying value during the adjustment according to change of the brightness of the adjustment control more intuitively, and the implementation thereof is similar as that shown in FIG. 2A and is not described here.

Figure 2D:
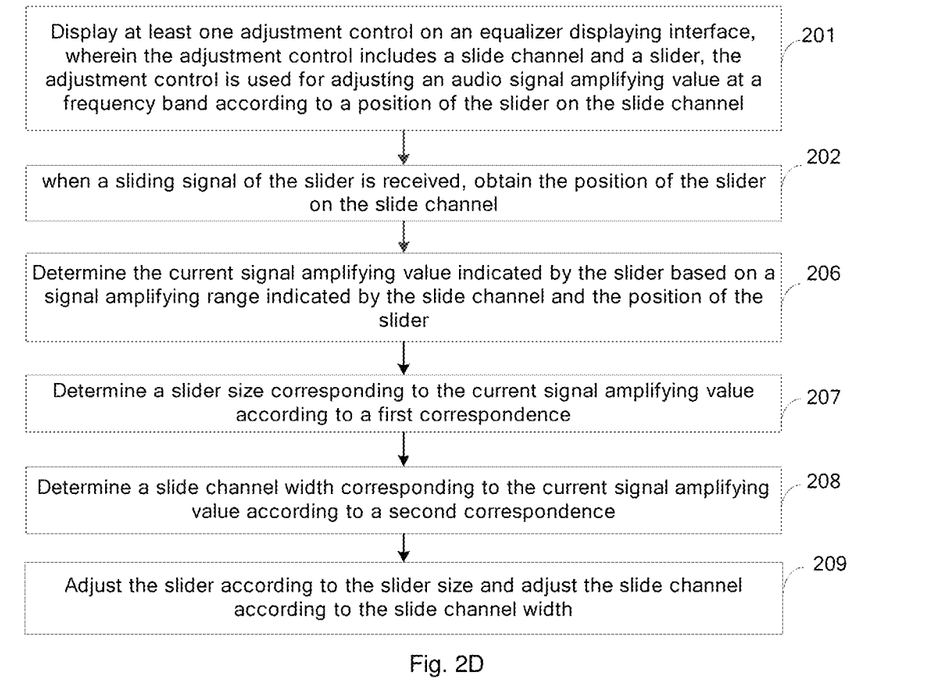
FIG. 2D is a flow chart illustrating another method for displaying a control according to various embodiments of the present disclosure.

Based on the embodiment shown in FIG. 2A, in other embodiments, the media player may change the size of the slider and the width of the slide channel in the adjustment control based on the position of the slider on the slide channel. Therefore, the user may sense change of the audio signal amplifying value during the adjustment according to change of the size of the adjustment control more intuitively. As shown in FIG. 2D, the blocks 203 to 205 may be replaced by the following.

In block 206, the current signal amplifying value indicated by the slider is determined based on a signal amplifying range indicated by the slide channel and the position of the slider.

When the slider slides, the media player obtains the signal amplifying range indicated by the slide channel where the slider is located and calculates the current signal amplifying value indicated by the current slider based on the position of the slider.

For example, when the signal amplifying range indicated by the slide channel where the slider is located is from −10 db to 10 db and the position of the slider is at ¼ from the bottom of the slide channel, the current signal amplifying value indicated by the slider is −5 db.

In block 207, a slider size corresponding to the current signal amplifying value is determined according to a first correspondence.

According to the calculated current signal amplifying value, the media player searches the first correspondence for the corresponding slider size, wherein the correspondence between the signal amplifying value and the slider size may be as shown in Table 2.

TABLE 2

| Signal amplifying value | −10 db-5 db | −5 db-0 db | 0 db-+5 db | +5 db-+10 db |
|---|---|---|---|---|
| Slider size | 10 px | 15 px | 25 px | 30 px |

In block 208, a slide channel width corresponding to the current signal amplifying value is determined according to a second correspondence.

Similarly as block 207, the media player searches the second correspondence for the corresponding slide channel width based on the calculated current signal amplifying value, wherein the correspondence between the signal amplifying value and the slide channel width may be as shown in Table 3.

TABLE 3

| Signal amplifying value | −10 db-5 db | −5 db-0 db | 0 db-+5 db | +5 db-+10 db |
|---|---|---|---|---|
| Slide channel width | 5 px | 10 px | 15 px | 20 px |

It should be noted that blocks 207 and 208 do not have a strict sequence, that is, block 207 and block 208 may be performed simultaneously, or block 208 may be executed before block 207, and this embodiment only shows an example in which block 207 is performed before block 208, the present disclosure is not restricted to this.

In addition, in order to achieve a better displaying effect, after calculating the current signal amplifying value, the media player may calculate the corresponding slider size and the slide channel width according to a predefined function, such that the slider size and the slide channel width may change gradually as the slider slides. The present disclosure is not restricted to this.

In block 209, the slider is adjusted according to the slider size and the slide channel is adjusted according to the slide channel width.

Similarly to block 205, the media player generates the corresponding image frame data based on the slider size and the slide channel width, and calls the system API to render the image frame data so as to display the adjustment control with the adjusted size on the equalizer displaying interface.

Figure 2E:
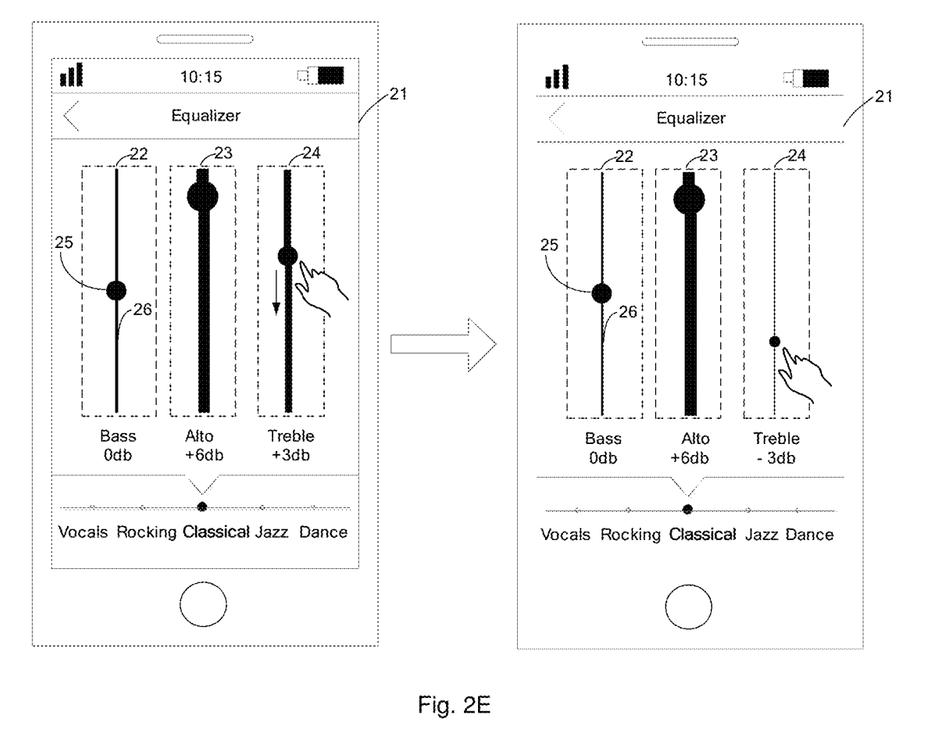
FIG. 2E is an implementation schematic diagram of the embodiment shown in FIG. 2D.

For example, as shown in FIG. 2E, when the slider 25 in the third adjustment control 24 slides downwards, the slider size of the slider 25 in the third adjustment control 24 is reduced and the slide channel width of the slide channel 26 is reduced.

In various embodiments, the media player calculates the corresponding slider size and the slide channel width based on the position where the slider is located and adjusts the displaying size of the adjustment control according to the slider size and the slide channel width, such that the user may sense the change of the signal amplified value according to the change of the size of the adjustment control more intuitively, which is convenient for the user to perform the adjustment.

Figure 2F:
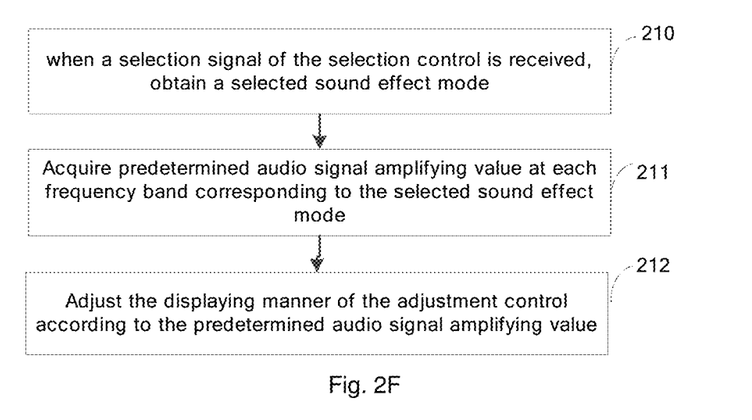
FIG. 2F is a flow chart illustrating a selection process of sound mode related to a method for displaying a control provided by various embodiments of the present disclosure.

In order to facilitate the user to perform the adjustment quickly, the equalizer displaying interface may also include a selection control for the user to select a sound effect mode matching with a genre of a song currently played, as shown in FIG. 2F, the method may further include the following.

In block 210, when a selection signal of the selection control is received, a selected sound effect mode is obtained.

Figure 2G:
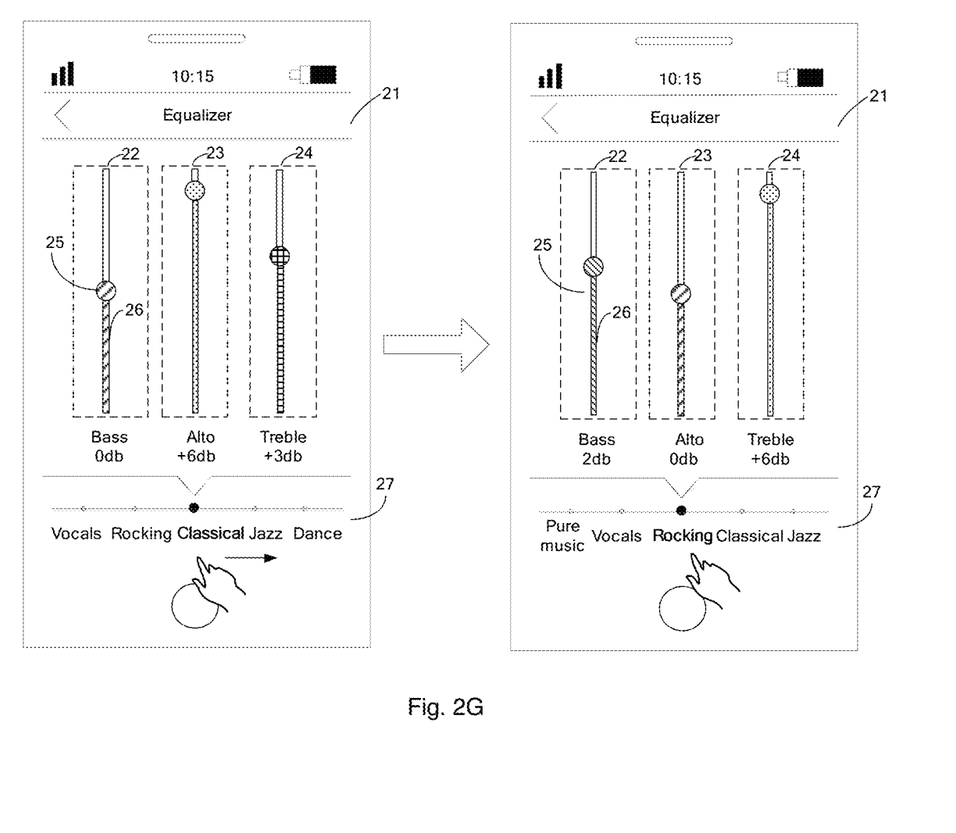
FIG. 2G is an implementation schematic diagram of the embodiment shown in FIG. 2F.

For example, as shown in FIG. 2G, when the user scrolls the selection control 27, the media player receives the selection signal and determines the selected sound effect mode based on the selection signal. In FIG. 2G, the selected sound effect mode changes from classical mode to rocking mode.

In block 211, a predetermined audio signal amplifying value at each frequency band corresponding to the selected sound effect mode is obtained.

After obtaining the selected sound effect mode, the media player further obtains the predetermined audio signal amplifying value at each frequency band corresponding to the sound effect mode, wherein the predetermined audio signal amplifying value at each frequency band corresponding to different sound effect modes may be as shown in the table 4.

TABLE 4

| The sound mode | Pure music | Vocals | Rocking | Classical | Jazz | Dance |
|---|---|---|---|---|---|---|
| Bass | +8 db | +6 db | 2 db | 0 db | −4 db | 0 db |
| Alto | 0 db | +2 db | 0 db | +6 db | 0 db | +4 db |
| Treble | −4 db | +6 db | +6 db | +3 db | +3 db | +2 db |

In block 212, the displaying manner of the adjustment control is adjusted according to the predetermined audio signal amplifying value.

After obtaining the predetermined audio signal amplifying value at each frequency band corresponding to the selected sound effect mode, the media player adjusts the displaying manner of the adjustment control according to the predetermined audio signal amplifying value, and the implementation is similar to blocks 203 to 205 and blocks 206 to 209, which is not repeated herein.

In various embodiments, through configuring the selection control on the equalizer displaying interface, the user may select the sound effect mode matching with the genre of the current playing song quickly, adjustment efficiency of the user is improved, and the user may sense the difference of the audio signal amplifying value at each frequency band corresponding to different sound effect modes more intuitively, which reduces the learning cost of the user.

The following describes various embodiments of a device provided by the present disclosure, reference may be made to the corresponding method embodiments for the details of the device.

Figure 3:
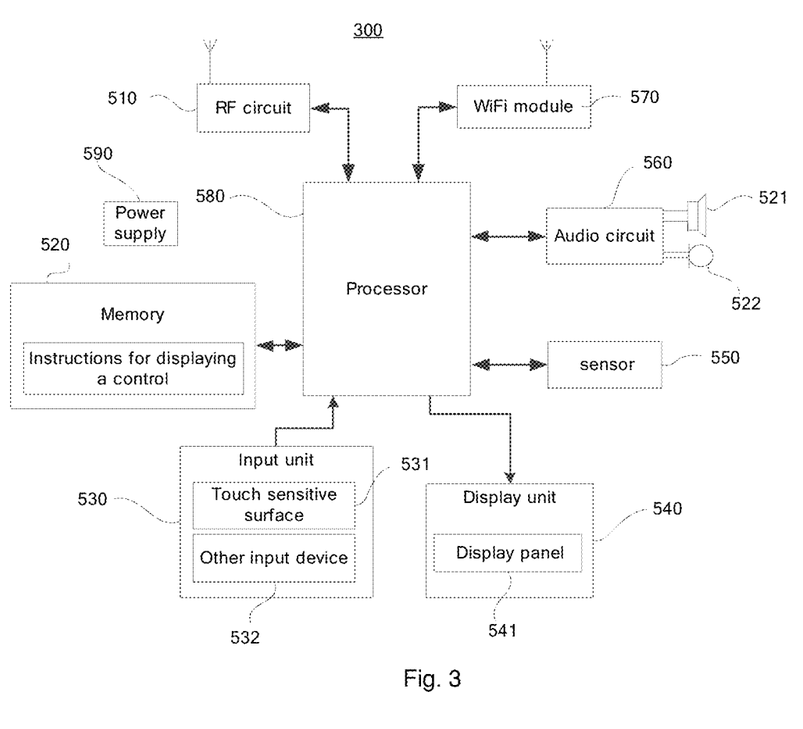
FIG. 3 is a schematic diagram illustrating a structure of electronic device according to various embodiments of the present disclosure.

FIG. 3 is a schematic diagram illustrating a structure of an electronic device according to various embodiment of the present disclosure. The electronic device may be a media player, a tablet computer, an MP3 player or a portable computer, etc.

The device 300 may include an RF (Radio Frequency) circuit 510, a memory 520 including one or more computer-readable storage media, an input unit 530, a display unit 540, a sensor 550, an audio circuit 560, a short-distance wireless transmission module 570, a processor 580 including one or more processing cores, a power supply 590, and/or other components. It may be known to those with ordinary skill in the art that, the structure of the device is not restricted to that shown in FIG. 3. More or less components may be included, or some components may be combined or different component layout may be configured.

The RF circuit 510 may be configured to send and receive information in the process of receiving and transmitting signals or during a call. Particularly, after receiving the downlink information of the base station, it may provide the downlink information to the one or more processors 580 for processing. In addition, the data related to uplink transmission may be sent to the base station. The RF circuit 510 may include but not limited to an antenna, at least one amplifier, a tuner, one or more oscillators, a Subscriber Identity Module (SIM) card, a transceiver, a coupler, a Low Noise Amplifier (LNA), a duplexer, etc. In addition, the RF circuit 510 may also communicate with other devices by the wireless communication network. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS).

The memory 520 may be configured to store software programs and modules. Processor 580 executes the software programs and modules stored in the memory 520 to perform a variety of functional applications and data processing. Memory 520 may include a program storage area and a data storage area. The program storage area may store an operating system, an application required by at least one function (such as a sound playback function, image playback function, etc.). The data storage area may store the data that created during usage of device 300 (such as audio data, phone book, etc.) In addition, the memory 520 may include high-speed random access memory and may include non-transitory memory, such as at least one disk storage device, flash memory device, or other non-transitory solid-state memory device. Accordingly, the memory 520 may also include a memory controller to provide the access to the memory 520 for the processor 580 and input unit 530. Although FIG. 3 shows the RF circuit 510, it may be understood that, it may be not necessary for the device 300 and may be omitted without departing from the principle of the application.

The input unit 530 may be configured to receive input number or character information, and to generate signal input of keyboard, mouse, operating handle, optical or track ball, which is related to user settings and functional control. Specifically, the input unit 530 may include a touch sensitive surface 531, and other input device 532. The touch sensitive surface 531 may be also known as touch screen or touch pad, it can collect the touch operation on or over it (for example, the operation of user using a finger, a stylus pen and any other suitable object or accessory on the touch sensitive surface 531 or near the touch-sensitive surface 531), and can drive the corresponding connected device according to a preset program. The touch sensitive surface 531 may include two parts: a touch detection device and a touch controller. The touch detection device detects the user's touch position and the signal generated by touch operation, and transmits the signal to the touch controller. The touch controller may receive touch information from the touch detection device and convert it into touch point coordinates, then send to the processor 580, and the touch controller can receive and implement commands sent by the processor 580. In addition, the touch sensitive surface 531 may be implemented in forms of resistance type, capacitive type, infrared type, and surface acoustic wave type, and other type. Besides the touch sensitive surface 531, the input unit 530 may also include other input device 532. In particular, the other input device 532 may include, but not limited to one or more of the following: physical keyboard, function keys (such as volume control buttons, switch buttons, etc.), track ball, mice, operating handle and so on.

The display unit 540 may be configured to display information input by the user, or information provided to the user, and control various graphical user interfaces of device 300. The graphical user interfaces may include graphics, text, icons, video, and any combination thereof. The display unit 540 may include a display panel 541, which may be implemented by a Liquid Crystal Display (LCD), Organic Light-Emitting Diode (OLED) and other manner. Further, the touch-sensitive surface 531 may configured over the display panel 541, when the touch sensitive surface 531 detects touch operation on or near it, the touch operation may be transmitted to the processor 580 to determine the type of touch event, then the processor 580 provides relevant visual output on the display panel 541 according to the touch event type. Although in FIG. 3, the touch sensitive surface 531 and the display panel 541 are shown as two separate components to achieve the input and output functions, in some embodiments, the touch sensitive surface 531 and the display panel 541 may be integrated to achieve input and output functions.

The device 300 also includes at least a sensor 550 such as a light sensor, a motion sensor, and other sensors. Specifically, the light sensor may include an ambient light sensor and a proximity sensor, wherein the ambient light sensor may adjust the brightness of the display panel 541 according to the ambient light's brightness. The proximity sensor may close the display panel 541 and/or backlighting when device 300 is moved to the ear. As a motion sensor, gravity sensor can detect the speed of acceleration in all directions (usually triaxial). The speed and direction of gravity can be detected when it is still, which can be used by applications recognizing gestures of the device (such as horizontal and vertical screen switch, relevant game, attitude magnetometer calibration), or used by vibration recognition related functions (such as pedometer, percussion) and the like. Other sensors may also be configured in the device 300, such as gyroscope, barometer, hygrometer, thermometer, the infrared sensor, which are not described herein.

The audio circuit 560, speaker 521 and microphone 522 may provide an audio interface between the user and device 300. The audio circuit 560 may convert received audio data into electrical signal and transmit the converted electrical signal to the speaker 521, then the speaker 521 may convert electrical signal to sound signal and output it. On the other hand, the microphone 522 may convert collected sound signal into electrical signal, which may be received by the audio circuit 560 and converted into audio data, then after processed by processor 580, the audio data may be sent by the RF circuit 510 to the other device, or may be output to the memory 520 for further processing. The audio circuit 560 may also include: headset jack, which may provide the communication between peripherals headphones and device 300.

The short-distance wireless transmission module 570 may be a WIFI (wireless fidelity) module, a Bluetooth module or an infrared module. The device 300 may transmit information through short-distance wireless transmission module 570 to the wireless transmission module provided on the peer device.

The processor 580 is a control center of the device 300. The processor 580 uses a variety of interfaces and lines to connect the various parts of the entire control device, it performs each function and processes data of the device 300 so as to monitor the device 300 overall by running or executing software program or module stored in the memory 520, and by calling data stored in the memory 520. The processor 580 may include one or more processing cores. The processor 580 may be integrated application processor and modem processor. The application processor mainly processes operating system, user interface and applications, and the modem processor mainly deals with wireless communications. It is appreciated that the modem processor may also not be integrated in the processor 580.

The device 300 also includes a power supply 590 (e.g., a battery), the power supply 590 is connected with the processor 580 logically through power management system, so it can achieve charging, discharging and power management functions through power management system. The power supply 590 may also include one or more DC or AC power, recharging system, power malfunction detection circuit, a power converter or inverter, power status indicators and any other part.

Although not shown, the device 300 may also include a camera, a Bluetooth module, which is not described herein.

The device 300 may also include a memory, and one or more programs, wherein the one or more programs may be stored in the memory, and may be configured so as to be executed by one or more processors.

In various embodiments of the present disclosure, instructions may be stored in the memory 520, and may be executed by the one or more processors 580.

The instructions, when executed by the one or more processors 580, cause the one or more processors 580 to:

display at least one adjustment control on an equalizer displaying interface, wherein the adjustment control includes a slide channel and a slider, the adjustment control is used for adjusting output of an amplifier of an audio signal at a corresponding frequency band according to a position of the slider on the slide channel;

obtain the position of the slider on the slide channel when a sliding signal of the slider is received;

adjust a displaying manner of the adjustment control according to the position of the slider.

In some embodiments, the instructions that cause the one or more processors 580 to adjust the displaying manner further cause the one or more processors 580 to:

adjust color of at least one of the slider, a first part of the slide channel and a second part of the slide channel according to position of the slider; wherein the first part is from the slider to bottom of the slide channel, the second part is from the slider to top of the slide channel.

In some embodiments, the instructions that cause the one or more processors 580 to adjust the displaying manner further cause the one or more processors 580 to:

adjust brightness of at least one of the slider, the first part of the slide channel and the second part of the slide channel according to the position of the slider.

In some embodiments, the instructions that cause the one or more processors 580 to adjust the displaying manner further cause the one or more processors 580 to:

adjust a slider size of the slider and a slide channel width of the slide channel according to the position of the slider.

In some embodiments, the instructions that cause the one or more processors 580 to adjust the displaying manner further cause the one or more processors 580 to:

calculate a percentage of the first part of the slide channel to the slide channel based on the position of the slider;

determine a corresponding color value in a color changing space based on the percentage, wherein the color changing space corresponds to the slide channel; and adjust color of at least one of the slider, the first part of the slide channel and the second part of the slide channel according to the color value.

In some embodiments, the instructions that cause the one or more processors 580 to adjust the displaying manner further cause the one or more processors 580 to:

generate image frame data corresponding to the adjustment control with an adjusted color based on the color value;

render the image frame data by calling an system application programmable interface (API), to display the adjustment control with the adjusted color on the equalizer displaying interface.

In some embodiments, the instructions that cause the one or more processors 580 to adjust the slider size of the slider and the slide channel width of the slide channel further cause the one or more processors 580 to:

determine a current signal amplifying value indicated by the slider based on an audio signal amplifying value range indicated by the slide channel and the position of the slider;

search a first correspondence for a slider size corresponding to the current signal amplifying value;

search a second correspondence for a slide channel width corresponding to the current signal amplifying value;

adjust the size of the slider according to the slider size; and adjust the width of the slide channel according to the slide channel width.

In some embodiments, the equalizer displaying interface further includes a selection control, the selection control includes at least two sound effect modes, the instructions further cause the one or more processors 580 to:

obtain a selected sound effect mode when a selection signal of the selection control is received;

obtain a predetermined audio signal amplifying value at each frequency band corresponding to the selected sound effect mode;

adjust the displaying manner of the adjustment control according to the predetermined audio signal amplifying value.

In addition, the device for displaying a control provided by the embodiment may be implemented similarly as the method for displaying a control, and the specific implementation process is described in the method embodiments in detail, and is not described herein.

The singular form "a", "an", and "the" are intended to denote at least one of a particular element. It also should be understood that "and/or" used herein are intended to denote any and all possible combinations of one or more of particular elements.

The sequential numbers of the present disclosure are for facilitating the description and do not indicate any preference of the embodiments.

It will be understood by those with ordinary skill in the art that at least one of the steps implementing the embodiments above, may be accomplished by hardware, or by instructing associated hardware through programs, that is, the programs may be executed by the associated hardware to implement at least one of the steps above. The programs may be stored in a computer-readable storage medium. The storage medium above may be a read-only memory, a magnetic disk, or an optical disk. The computer-readable storage medium may be a non-transitory computer-readable storage medium.

What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What is claimed is:

1. A method for displaying a control, comprising:
 displaying at least one adjustment control on an equalizer displaying interface, wherein the adjustment control includes a slide channel and a slider, the adjustment control is used for adjusting an audio signal amplifying value at a frequency band according to a position of the slider on the slide channel;
 receiving a sliding signal of the slider when the slider slides along the slide channel;
 obtaining a position of the slider on the slide channel;
 adjusting a displaying manner of the adjustment control according to the position of the slider, wherein the displaying manner of the adjustment control comprises a size of the slider and a uniform width of the slide channel, the position of the slider on the slide channel being represented by a location the slider is at from a bottom of the slide channel, and
 wherein the adjusting the size of the slider and the uniform width of the slide channel according to the position of the slider comprises:
  determining a current signal amplifying value indicated by the slider based on an audio signal amplifying range indicated by the slide channel and the position of the slider;
  searching a first correspondence for a slider size corresponding to the current signal amplifying value;
  searching a second correspondence for a slide channel width corresponding to the current signal amplifying value;
  adjusting the size of the slider according to the slider size and simultaneously adjusting the uniform width of the slide channel according to the slide channel width;
 generating image frame data corresponding to the adjusted displaying manner of the adjustment control; and
 rendering the image frame data by calling a system application program interface (API), to display the adjustment control on the equalizer displaying interface according to the adjusted displaying manner.

2. The method according to claim 1, wherein the adjusting the displaying manner of the adjustment control according to the position of the slider comprises:
 adjusting a color of at least one of the slider, a first part and a second part of the slide channel according to the position of the slider; wherein the first part is from the slider to bottom of the slide channel, the second part is from the slider to top of the slide channel.

3. The method according to claim 2, wherein the adjusting the color of at least one of the slider, the first part and the second part of the slide channel according to the position of the slider comprises:
 calculating a percentage of the first part of the slide channel to the slide channel based on the position of the slider;
 determining a color value in a color changing space based on the percentage, wherein the color changing space corresponds to the slide channel;
 adjusting the color of at least one of the slider, the first part and the second part of the slide channel according to the color value.

4. The method according to claim 3, wherein the adjusting the color of at least one of the slider, the first part and the second part of the slide channel according to the color value comprises:
 generating, based on the color value, image frame data corresponding to an adjusted color of the adjustment control;
 rendering the image frame data by calling a system application program interface (API), to display the adjustment control with the adjusted color on the equalizer displaying interface.

5. The method according to claim 1, wherein the adjusting the displaying manner of the adjustment control according to the position of the slider comprises:
 adjusting brightness of at least one of the slider, a first part and a second part of the slide channel according to the position of the slider; wherein the first part is from the slider to bottom of the slide channel, the second part is from the slider to top of the slide channel.

6. The method according to claim 1, wherein the equalizer displaying interface further includes a selection control, the selection control includes at least two sound modes, the method further comprises:
 obtaining a selected sound mode when a selection signal of the selection control is received;
 obtaining the predetermined audio signal amplifying value corresponding to each frequency band of the selected sound effect mode; and
 adjusting the displaying manner of the adjustment control according to the predetermined audio signal amplifying value.

7. A device for displaying a control, comprising:
 one or more memories;
 one or more processors; wherein
 the one or more memories store instructions that, when executed by the one or more processors, cause the processor to:
 display at least one adjustment control on an equalizer displaying interface, wherein the adjustment control includes a slide channel and a slider, the adjustment control is used for adjusting an audio signal amplifying value at a corresponding frequency band according to a position of the slider on the slide channel;
 obtain the position of the slider on the slide channel when a sliding signal of the slider is received;
 adjust a displaying manner of the adjustment control according to the position of the slider, wherein the displaying manner of the adjustment control comprises a size of the slider and a uniform width of the slide channel, the position of the slider on the slide channel being represented by a location the slider is at from a bottom of the slide channel, and
 wherein the adjusting the size of the slider and the uniform width of the slide channel according to the position of the slider comprises:
  determining a current signal amplifying value indicated by the slider based on an audio signal amplifying range indicated by the slide channel and the position of the slider;
  searching a first correspondence for a slider size corresponding to the current signal amplifying value;

searching a second correspondence for a slide channel width corresponding to the current signal amplifying value;

adjusting the size of the slider according to the slider size and simultaneously adjusting the uniform width of the slide channel according to the slide channel width;

generate image frame data corresponding to the adjusted displaying manner of the adjustment control; and render the image frame data by calling a system application program interface (API), to display the adjustment control on the equalizer displaying interface according to the adjusted displaying manner.

8. The device according to claim 7, wherein the instructions that cause the one or more processors to adjust the displaying manner further cause the one or more processors to:

adjust color of at least one of the slider, a first part of the slide channel and a second part of the slide channel according to position of the slider; wherein the first part is from the slider to bottom of the slide channel, the second part is from the slider to top of the slide channel.

9. The device according to claim 8, wherein the instructions that cause the one or more processors to adjust the displaying manner further cause the one or more processors to:

calculate a percentage of the first part of the slide channel to the slide channel based on the position of the slider;

determine a corresponding color value in a color changing space based on the percentage, wherein the color changing space corresponds to the slide channel; and adjust color of at least one of the slider, the first part of the slide channel and the second part of the slide channel according to the color value.

10. The device according to claim 9, wherein the instructions that cause the one or more processors to adjust the displaying manner further cause the one or more processors to:

generate image frame data corresponding to the adjustment control with an adjusted color based on the color value;

render the image frame data by calling a system application programmable interface (API), to display the adjustment control with the adjusted color on the equalizer displaying interface.

11. The device according to claim 7, wherein the instructions that cause the one or more processors to adjust the displaying manner further cause the one or more processors to:

adjust brightness of at least one of the slider, the first part of the slide channel and the second part of the slide channel according to the position of the slider.

12. The device according to claim 7, wherein the equalizer displaying interface further includes a selection control, the selection control includes at least two sound effect modes, the instructions further cause the one or more processors to:

obtain a selected sound effect mode when a selection signal of the selection control is received;

obtain a predetermined audio signal amplifying value at each frequency band corresponding to the selected sound effect mode;

adjust the displaying manner of the adjustment control according to the predetermined audio signal amplifying value.

13. A non-transitory computer readable storage medium, wherein the storage medium stores computer-readable instructions that, when executed by one or more processors, cause the one or more processors to:

display at least one adjustment control on an equalizer displaying interface, wherein the adjustment control includes a slide channel and a slider, the adjustment control is used for adjusting an audio signal amplifying value at a frequency band according to a position of the slider on the slide channel;

obtain the position of the slider on the slide channel when a sliding signal of the slider is received;

adjust a displaying manner of the adjustment control according to the position of the slider, wherein the displaying manner of the adjustment control comprises a size of the slider and a uniform width of the slide channel, the position of the slider on the slide channel being represented by a location the slider is at from a bottom of the slide channel, and wherein the adjusting the size of the slider and the uniform width of the slide channel according to the position of the slider comprises:

determining a current signal amplifying value indicated by the slider based on an audio signal amplifying range indicated by the slide channel and the position of the slider;

searching a first correspondence for a slider size corresponding to the current signal amplifying value;

searching a second correspondence for a slide channel width corresponding to the current signal amplifying value;

adjusting the size of the slider according to the slider size and simultaneously adjusting the uniform width of the slide channel according to the slide channel width;

generate image frame data corresponding to the adjusted displaying manner of the adjustment control; and render the image frame data by calling a system application program interface (API), to display the adjustment control on the equalizer displaying interface according to the adjusted displaying manner.

14. The non-transitory computer readable storage medium of claim 13, wherein the instructions that cause the one or more processors to adjust the displaying manner further cause the one or more processors to:

adjust color of at least one of the slider, a first part of the slide channel and a second part of the slide channel according to position of the slider; wherein the first part is from the slider to bottom of the slide channel, the second part is from the slider to top of the slide channel.

15. The non-transitory computer readable storage medium of claim 13, wherein the instructions that cause the one or more processors to adjust the displaying manner further cause the one or more processors to:

adjust brightness of at least one of the slider, the first part of the slide channel and the second part of the slide channel according to the position of the slider.

* * * * *